(12) United States Patent
Albarado et al.

(10) Patent No.: US 7,193,501 B1
(45) Date of Patent: *Mar. 20, 2007

(54) ENCLOSURE SYSTEM ALLOWING FOR HOT WORK WITHIN THE VICINITY OF FLAMMABLE AND COMBUSTIBLE MATERIAL

(75) Inventors: Jason P. Albarado, Houma, LA (US); Todd J. Hutchinson, Houma, LA (US)

(73) Assignee: Alford Safety Services, Inc., Houma, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/176,495

(22) Filed: Jul. 7, 2005

Related U.S. Application Data

(63) Continuation-in-part of application No. 11/011,848, filed on Dec. 14, 2004, which is a continuation-in-part of application No. 10/388,271, filed on Mar. 13, 2003, now abandoned.

(51) Int. Cl.
*G05B 23/02* (2006.01)
(52) U.S. Cl. .................. 340/3.1; 340/506; 340/626; 340/679; 340/691.6
(58) Field of Classification Search .............. None
See application file for complete search history.

(56) References Cited

U.S. PATENT DOCUMENTS

| | | | |
|---|---|---|---|
| 3,626,836 A * | 12/1971 | Schneidler | 454/339 |
| 4,297,940 A * | 11/1981 | Hainline | 454/49 |
| 4,298,955 A | 11/1981 | Munday et al. | |
| 5,018,321 A | 5/1991 | Wardlaw, III | |
| 5,101,604 A * | 4/1992 | Wardlaw, III | 52/2.17 |
| 5,565,852 A | 10/1996 | Peltier et al. | |
| 5,755,884 A * | 5/1998 | Buckler et al. | 118/317 |
| 5,854,994 A * | 12/1998 | Canada et al. | 702/56 |
| 6,060,689 A * | 5/2000 | Wilson | 219/137.41 |
| 6,130,412 A * | 10/2000 | Sizemore | 219/481 |
| 6,540,603 B1 * | 4/2003 | Koskinen | 454/58 |
| 6,583,386 B1 * | 6/2003 | Ivkovich | 219/130.01 |
| 6,687,005 B2 * | 2/2004 | Kim | 356/437 |
| 6,783,054 B1 * | 8/2004 | Pregeant et al. | 228/102 |
| 2004/0122353 A1 | 6/2004 | Shahmirian et al. | |

FOREIGN PATENT DOCUMENTS

| GB | 2311847 A | 10/1997 |
|---|---|---|
| GB | 2382593 A | 6/2003 |

OTHER PUBLICATIONS

Welding Hot Work Habitats SPE Health, Safety and Environment in Oil and Gas Exploration and Production Conference, Jan. 25-27, Jakarta, Indonesia; Author: Browning, I.G.

* cited by examiner

*Primary Examiner*—Benjamin C. Lee
*Assistant Examiner*—Son Tang
(74) *Attorney, Agent, or Firm*—Henry E. Naylor; Kean, Miller, Hawthorne, D'Armond, McCowan & Jarman, LLP

(57) ABSTRACT

An enclosure constructed around an area at which hot work is to be performed at a facility containing flammable or combustible material. Hot work includes such things as welding, torch cutting, grinding and the like. Facilities include petroleum drilling and production platforms, oil tankers, petroleum and chemical plants, and petroleum tank farms. Gas detection monitoring apparatuses are used with the enclosure which will automatically simultaneously shutdown one or more enclosures.

40 Claims, 5 Drawing Sheets

ENCLOSURE SYSTEM ALLOWING FOR HOT WORK WITHIN THE VICINITY OF FLAMMABLE AND COMBUSTIBLE MATERIAL

CROSS-REFERENCE TO RELATED APPLICATIONS

This application is a continuation-in-part of U.S. Ser. No. 11/011,848 filed Dec. 14, 2004, which is a continuation-in-part of U.S. Ser. No. 10/388,271 filed Mar. 13, 2003 now abandoned.

FIELD OF THE INVENTION

The present invention relates to a system, that incorporates one or more enclosures constructed around one or more objects at which, "hot work" is to be performed at a facility containing flammable or combustible materials. Hot work includes such things as welding, torch cutting, grinding and the like that produces heat, spark or flame. The one or more enclosures are capable of being simultaneously and independently controlled and monitored by a single control and monitoring system.

BACKGROUND OF THE INVENTION

Hot work, such as welding, at facilities where flammable and combustible materials are present, is extremely dangerous and is regulated by the appropriate governmental agency depending on the facility. In the case of offshore platforms, hot work is regulated by the Mineral Management Service (MMS); in the case of pipeline, pumping stations and associated facilities, hot work is regulated by the Department of Transportation (DOT) and in the case of refineries and chemical plants, hot work is regulated by the Occupational Safety and Health Administration (OSHA). Regulations stipulate that hot work cannot be preformed in or on any of said facilities within 35 feet from the point of impact where slag, sparks or other burning materials could fall onto or in the vicinity of a storage area of a container containing flammable or combustible materials. Also, hot work cannot be preformed within 10 feet of a pressurized pipe or vessel containing flammable or combustible material in or on any of said facilities.

In some cases, the hot work operation can be setup in a safe area and items to be hot worked can be brought to this safe area, hot worked, and then returned to their original location. In most cases it is not practical, from a strategic or from an economic point of view, to setup a remote hot work location a distance away from the item that needs to be hot worked. In the past, a facility such as a petroleum production platform, would have to be shut down during hot work operations. Further, a section of pipe or vessel in a petroleum refinery or chemical plant would have to be purged and cleaned of flammable and combustible material before any hot work could be performed within 10 feet of it. This created a substantial financial burden for the operator of the platform or plant.

A welding habitat was developed within the last few years wherein a temporary building was built around an object to be hot-worked. The habitat, also referred to as an enclosure, is equipped with gas detection monitors that would automatically signal a shut down of all welding equipment when a predetermined concentration level of flammable or combustible gas is reached. For example, U.S. Pat. No. 6,783,054 to Pregeant Jr. et al. teaches and claims a system for conducting welding adjacent flammable materials on an offshore platform. The system contains an enclosed chamber having a blower and sensors, each of which monitors a single gas, typically a combustible gas, and the ability to automatically shutdown the welding operation if a predetermined unacceptable concentration of a combustible gas is detected at one or more sensors.

Co-pending applications U.S. Ser. No. 10/388,271 filed Mar. 13, 2003 and U.S. Ser. No. 11/011,848 filed Dec. 14, 2004, both of which are incorporated herein by reference, teach a welding habitat and control and monitoring system wherein there is wireless communication between gas detection devices and a CPU monitored by an operator.

While the industry is starting to see habitat and monitoring systems that enable hot work to be preformed in areas here-to-fore not allowed unless the facility was shut-down, there is still a need in the art for improved hot work enclosures and monitoring and control systems that lead to a more economical and safe hot work operation.

SUMMARY OF THE INVENTION

In accordance with the present invention there is provided an enclosure system comprised of one or more enclosures built about at least one object to be hot worked at a facility wherein flammable or combustible materials are located within a hazardous distance from where the hot work is to be performed, which enclosure system is comprised of:

a) at least one enclosure, each enclosure comprising: i) enclosing walls, ceiling and floor defining a chamber in which hot work is to be performed; ii) at least one door to allow workers to enter and exit; iii) at least one viewing window; iv) at least one air inlet port; v) at least one air outlet port; vi) at least one blower in fluid communication with said at least one air inlet port vii) a blower control in communication with said at least one blower, wherein said blower control is capable of allowing the blower to operate in the event of a shutdown that is not triggered by a gas detection monitor located at the intake of the blower; viii) at least one manual emergency shutdown switch inside of said enclosure; and ix) at least one manual emergency shutdown switch outside of, but within the immediate perimeter of, said enclosure;

b) a monitoring system comprised of:
i) a plurality of gas detection monitors located at predetermined locations: a) inside and outside of each enclosure; b) in the vicinity of the hot work equipment; and c) in the vicinity of the intake of each of said at least one blower; each of said gas detection monitors having a means of communication with a gas detection controller console; and ii) a gas detection controller console comprised of: a) a means capable of receiving data transmitted from the plurality of the gas detection monitors; b) an interface means capable of communicating data from the said receiving means of said console to the CPU; c) a central processing unit (CPU) containing software capable of, inter alia, accepting, storing computing, and displaying data received from said plurality of gas detection monitors; d) a display device in communication with said CPU and capable of displaying data from said plurality of gas detection monitors; and e) an interface means capable of communicating a signal from the CPU to a control system;

c) a control system comprised of:
i) an operator controller console comprised of: a) a source of electrical power for the system; b) at least one control device; c) a means for displaying the status of each enclosure; d) the capability of communicating predetermined bypass and system shutdown signals to a shutdown controller; and e) an audible alarm that will activate when a shutdown occurs.

ii) a shutdown controller capable of sending shutdown signals to one or more enclosure control devices, one or more shutdown control devices, and to various equipment associated with the hot work to be conducted in said one or more enclosures; and iii) an enclosure controller comprised of a differential pressure monitor for monitoring the pressure within the enclosure relative to the pressure outside of the enclosure, a programmable logic control device, an audible alarm, a visual alarm, and a manual shut-down switch.

In a preferred embodiment, said at least one enclosure also comprises one or more of the following: a) a power control; b) a temperature probe; c) a temperature detector; d) emergency lights; or e) a capable sealing system.

In another preferred embodiment, the shutdown controller and enclosure controllers are provided with a remote control panel for performing predetermined control functions, remote of the operator controller console.

In another preferred embodiment, there is provided, devices for wireless communication between the operator controller console, the shutdown controller and the one or more enclosure controllers.

In another preferred embodiment, the components of the gas detection controller console are integrated into the operator controller console. This new console serves as a system console and utilizes a separate display device for viewing the readings of the plurality of the gas detection monitors.

In another preferred embodiment, the DPM in any one or more enclosure controllers contains a manual gauge and/or a generated signal for a scaled readout of the current reading of the DPM, on a display device.

In another preferred embodiment, the operator controller console also has the ability to bypass the shutdown function of a differential pressure monitor (DPM) at each of the said at least one enclosures by the use of a manual or logic (PLC) switch.

In another preferred embodiment, the operator controller console also has the ability to bypass the shutdown function of a differential pressure monitor (DPM) at each of the said at least one enclosures by the use of a manual or logic (PLC) switch and an automatic, temporary bypass program.

In another preferred embodiment, there is provided devices for powering the components of the shutdown controller and the enclosure controllers, via solar power.

In another preferred embodiment, the hot work is selected from welding, cutting, and grinding.

In another preferred embodiment, the facility is a petroleum drilling platform, a petroleum production platform, a jack-up rig, a pumping station, a petroleum refinery, a tank farm, a chemical plant, an ocean going tanker, or a section of a pipeline.

BRIEF DESCRIPTION OF THE FIGURES

FIG. 2 is the use of a temperature probe and a temperature detector. The temperature probe is for monitoring the ambient temperature inside of the enclosure and the temperature detector is used to detect the temperature of an object being worked on inside the enclosure. Furthermore a "fire-eye," or arc sensitive switch is incorporated in part of the implementation of an automatic DPM bypass concept wherein the DPM will have a timed automatic bypass feature unless thee is hot work being performed inside of the enclosure.

DETAILED DESCRIPTION OF THE INVENTION

Figure 1:
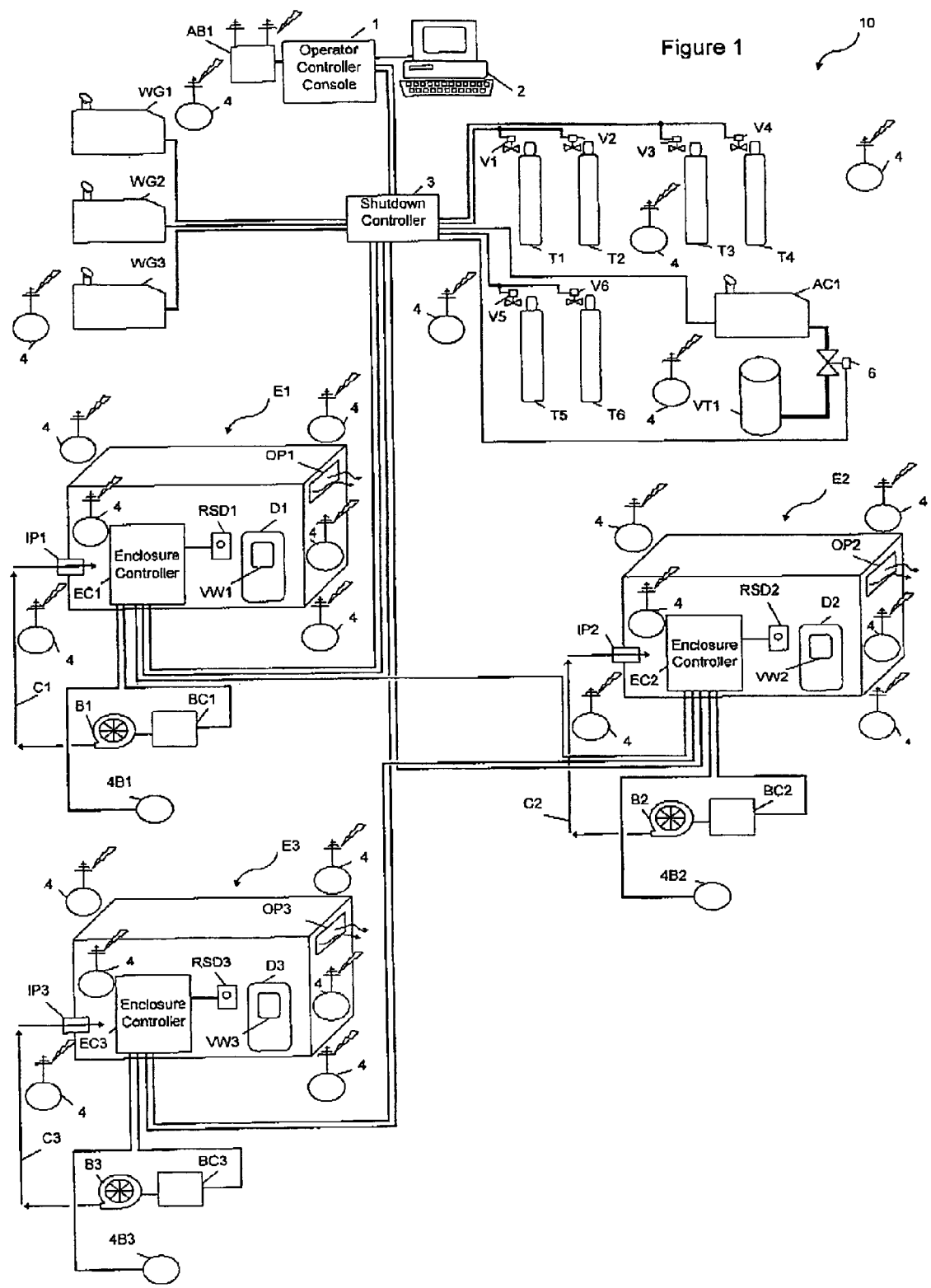
FIG. 1 hereof is schematic representation of one preferred embodiment of the monitored enclosure system of the present invention showing three enclosures that can be simultaneously and independently monitored and controlled. This schematic shows the use of both a wireless gas detection system and some hard wired gas detection monitors used to implement an automatic blower control concept, a control system; which uses software programmed controllers and further utilizes an operator controller console; which uses a touch screen application for a display device and for controlling some predetermined control functions.

The present invention can be utilized for any type of hot work and at any facility where flammable and/or combustible materials present a safety issue during hot work operations. The term "hot work" as used herein, means any work or operation, which could produce spark, flame or excessive heat resulting in a fire or explosion in the presence of combustible or flammable materials. Non-limiting examples of the types of hot work that can be conducted in the enclosures of the present invention include all types of welding, such as gas welding, electric arc welding and cutting, including gas tungsten arch welding (GTAW), gas shielding metal arch welding (GMAW), friction welding, laser welding, cutting such as with a torch or plasma cutter and cutting, brazing, soldering, and grinding with electric and pneumatic tools. Also included, is working in electrical panels while they are still energized in a location of the said facility considered to be classified, in reference to the presence of flammable or combustible materials, by a facility area classification drawing.

The present invention can be practiced at any type of facility where hot work is to be done in the vicinity of flammable or combustible material. Non-limiting examples of facilities where the instant invention can be practiced include petroleum drilling and production platforms, including jack-up rigs; pumping stations; petroleum refineries; chemical plants; tank farms where flammable or combustible materials are stored; and tankers and pipelines used for transporting flammable or combustible materials. As previously mentioned, governmental regulations are strict with respect to performing hot work at such facilities. In the past, at least a portion of such a facility would have to be shutdown prior to performing any hot work operation.

Practice of the present invention allows for safe and efficient hot work to be performed in the vicinity of flammable and combustible materials. At least one enclosure, also sometimes referred to herein as a habitat, is built around the object or objects to be hot worked. The enclosure is of temporary construction comprised of enclosing walls, ceiling extending between the walls and floor extending between the walls, thereby defining a chamber. It can take any shape depending on the object or objects to be hot worked and the particular site limitations at which it is to be built. Any material suitable for constructing such an enclosure can be used. Non-limiting examples of suitable construction materials include metals, ceramics, wood, and composite materials such as fiberglass and carbon fiber reinforced polymeric materials. Fire retardant wood is preferred, more preferably plywood, for the combination of safety, cost and convenience purposes. Scaffolding, if needed, can be provided to support at least a portion of each enclosure, particularly if the enclosure needs to be positioned lateral to a production or drilling platform. The enclosure will be large enough to allow a predetermined number of workers to comfortably work inside the enclosure with all necessary tools, hot work equipment and monitoring and safety devices. At least two workers will typically be in a single enclosure. If only two workers are provided, one worker will be the one performing the hot work and the other worker will typically be on fire watch for observing the hot work. Workers inside of the enclosure will have the capability of verbally communicating with the operator and workers outside of the enclosure by use of conventional means, preferably by two-way wireless radio.

Each enclosure will contain at least one door that preferably opens to the outside of the enclosure. The door will be one that can be easily opened from both the inside and outside of the enclosure and built in a break-away fashion, in case of an emergency. At least one shatterproof viewing window will be present on either the door or on one or more walls for observing activity within the enclosure. Shatterproof windows are well known in the art and are typically manufactured as laminated glass with an inner layer of transparent plastic material. All plastic viewing windows can also be used for the instant enclosure. The floor of each enclosure will preferably be lined with a suitable material capable of withstanding temperatures up to about 3000° F., preferably up to about 3500° F. Such a floor will preferably be comprised of a bottom layer of fire retardant plywood with a refractory cloth material. The cloth material, which will typically be supplied in rolls of ⅛ to ¼ inch thickness, is of the type marketed by Thermostatic Industries Inc. of Huntington Beach, Calif., under the tradename Panther Felt. Such a material is comprised of a refractory fiber, such as fiberglass or a ceramic fiber such as aluminosilicate or aluminoborosilicate. On top of the cloth layer will preferably be a relatively thin malleable layer of sheet metal material, preferably a stainless steel, to safely contain slag or sparks generated from the hot work operation. The floor will also preferably contain side plates (not shown) around the periphery of the floor to help contain sparks and slag. The side plates will typically be several inches to about a foot off the floor.

Each enclosure will also contain at least one inlet port to allow a suitable amount of air to be conducted into the enclosure by use of a blower, preferably an electrically operated blower. At least one air outlet port will also be provided. It is preferred that each air outlet port contain a spark resistant grill or filter to substantially reduce the potential of sparks being carried from inside of the enclosure to the outside where flammable or combustible materials may be present. Another preferred way of minimizing the risk of sparks and slag from exiting the enclosure at a high temperature is to provide a metal ventilation duct system (not shown). Such a system will be of sufficient length leading to the spark resistant filter so that any sparks or slag entering the ventilation system in the enclosure will cool to a safe temperature if they should ever reach the filter, and get through to the outside atmosphere.

Each enclosure, while in use, will be under a positive pressure to provide fresh air to workers inside the enclosure and to prevent gases from outside the enclosure from entering the interior of the enclosure. The pressure of each enclosure is monitored by a suitable differential pressure monitor (DMP), which is preferably an integral component of the enclosure controller. The present invention provides for the monitoring and control of multiple enclosures by a single operator using a single monitoring system and a single control system wherein multiple enclosures can be individually or all can be simultaneously shutdown, or certain equipment can be selectively bypassed if one or more predetermined events occur. Of course only a single enclosure can be monitored and controlled by the practice of the present invention.

It will be understood that each enclosure will also have an enclosure controller represented in FIGS. 5–8 hereof. The enclosure controller will be an integral unit containing such things as: a) a differential pressure monitor (DPM); b) at least one control device preferably a programmable logic controller; c) an audible alarm; d) a visual alarm; e) a backup battery system; f) a manual shutdown switch; g) a camera module; h) a component sensor module; i) a radio transceiver; and j) a remote control panel, preferably of the touch screen type. A basic enclosure controller will contain a DPM, at least the one control device, an audible alarm, and a visual alarm. The next more complex enclosure controller can contain manual shutdown switch and/or a backup battery. The enclosure controller(s) for an all wireless system would also include a radio transceiver.

It will also be understood that each enclosure will also have a conventional explosion proof lighting system supported by a backup battery system, so that lighting inside each enclosure will continue to function during an emergency shutdown. A conduit sealing system will also be used to create proper seal for sealing any spaces around cables, hoses, and pipes entering an enclosure from the outside.

The present invention will be better understood with reference to the figures hereof. FIG. 1 is a simplified schematic of one preferred embodiment of the present invention showing three enclosures systems wherein welding is the hot work to be performed in any one or more of the enclosures. All three enclosures are managed by a single operator using a single monitoring system, preferably a single wireless gas detection monitoring system, and a single control system. FIG. 1 shows three enclosures E1, E2, and E3, each having at least one door D1, D2, and D3, at least one air inlet port IP1, PI2, and IP3, and at least one air outlet port OP1, OP2, and OP3. It is preferred that the door open outward and that it be a break-away door. That is, a door constructed in such a way that in the event of an emergency a single worker of average strength could exert enough force so that the door breaks away from its support means and provides the worker with a means of escape.

In one embodiment the one or more of doors D1, D2, and D3 is provided with a safety door switch similar to those sold under the name Omron with the designations D4DS, D4BS and D4BL Series. Such a switch will indicate whether or not the door is open or closed, typically by use of a spring loaded pin that will be pushed in and in contact with a set of contacts when the door is closed. This will allow voltage to pass through the switch giving the operator an indication that the door is closed. Such a switch can be programmed in one or several ways. For example, it can be programmed in conjunction with a "fire-eye" or are sensitive switch so that if hot work is being performed inside the enclosure when the door was accidentally opened, the system would automatically shut down. The switch can also be programmed so that if no hot work was being performed when the door was opened a timing circuit would allow a predetermined amount of time to pass for the door to be closed before shutting down the system. If the door were shut in this predetermined amount of time the system would not shut down.

At least one shatterproof viewing window VW1, VW2, VW2, and VW3, will also be provided for each enclosure for observing workers inside the enclosure. The three enclosures are also in communication with appropriate hot work equipment, such as welding machines and generators WG1, WG2, and WG3, and associated gas tanks T1–T6. The gas tanks will typically contain welding gases such as oxygen and acetylene. Each tank is equipped with, respectively, a shutdown value V1–V6, which is activated in case of an emergency shutdown by receiving a shutdown signal from the shutdown controller 3. Valves V1–V6 will preferably be conventional solenoid valves readily available in the art. Further, each enclosure is provided with at least one remote manual emergency shutdown switch RSD1, RSD2, and RSD3. There is also a manual shutdown switch integrated in at least one of the enclosure controllers EC1, EC2, and EC3 and also for the operator monitoring the operator controller console 1.

It is within the scope of this invention that pneumatic tools be used in one or more of the enclosures. Such tools will require an air compressor AC1 and associated equipment for running the pneumatic tools, such as volume tank VT1 and blow-down valve 6. The blow-down valve 6 provides for the sudden bleeding of compressed air from the compressed air system in case of an emergency to prevent damage to such things as compressor seals. It also serves to immediately stop the operation of pneumatic tools in case of an emergency shutdown.

There is also a blower, B1, B2, and B3 associated with the inlet port of each enclosure for providing fresh air to the workers inside the enclosure, as well as for providing a positive pressure differential inside the enclosure. Although the blowers can be operated electrically or by use of compressed air, it is preferred that the blowers be electric blowers. Air is provided from the blowers to the inlet ports via any suitable hose or ducting C1, C2, and C3. It will be understood that the temperature inside of each enclosure can be controlled to some degree by providing either cool air or heated air into the blower intake. Cooled or heated air can be provided by an suitable means, such as by the use of a conventional heat exchange unit at the intake of the blower. It is preferred that each blower have associated therewith its own independent control device BC1, BC2, and BC3 each of which contains a shutdown relay SDR, in communication with said shutdown controller 3 but which can be bypassed by the operator at the operator controller console. That is, if the emergency shutdown is not triggered by the gas detection monitors 4B1, 4B2, and 4B3, at the intake of the blowers, then the blowers can be made to continue to operate for the safety of the workers inside the enclosure. It is preferred that each enclosure controller have associated therewith a power controller for controlling power to receptacles associated with each enclosure. The power controller will cut power to the receptacles in the case of a shutdown disabling all power tools used in and around the enclosure. Each power controller, as well as each blower control device will preferably contain a shutdown relay that is capable of shutting down power in response to a shutdown signal relayed to it.

As previously mentioned, each enclosed will also preferably have its own independently operated enclosure controller EC1, EC2, and EC3. This controller is a multifunctional unit container: a) at least one control device, preferably one, of the said at least one, being a programmable logic control device CT; b) an audible alarm AH; c) a visual alarm AL; d) a differential pressure monitor DPM; and e) a manual shutdown switch SD. Non-limiting examples of enclosures controllers used in the practice of the present invention are shown in FIGS. 5, 6, 7 and 8 hereof.

In a preferred embodiment, the enclosure controller will also contain one or more of the following items selected from: a) a manual emergency shutdown switch SD; b) a back-up battery system BB; c) a camera module CM; d) a component sensor module SM; e) a power converter supply PS; f) a radio transceiver RT, used for wireless communication; or g) a remote control panel RCP, touch screen application. The component sensor module SM will be capable of sensing one or more variable inside of the enclosure controller. Such variable include temperature, humidity, air flow, and sound. It is more preferably that at least the temperature and humidity be monitored.

In another preferred embodiment, the DPM contained in the enclosure controller will be an integral device containing: a) a differential pressure switch; b) a gauge, for a manual readout of the current differential pressure reading; and c) a transmitter for sending a signal to the programmable control device CT for a readout of the current differential pressure reading via a display device.

One type of difference pressure monitor that can be used in the practice of the present invention is the Explosion Proof Differential Switch, such as the Model 1950, manufactured by Dwyer Instruments, Inc., of Michigan City, Ind. The interior of the enclosure is at a higher pressure than the pressure outside of the enclosure to prevent flammable or combustible gases from entering the enclosure during hot work operation. If the pressure inside the enclosure drops to substantially the pressure outside of the enclosure, a signal is sent to the shutdown controller 3, which sends the appropriate shutdown signal to all welding equipment, including tank valves, welding machines, etc. There will be times when workers need to enter or exit the enclosure during normal and safe working conditions and unless the DPM(s) can be bypassed, an emergency shutdown will occur anytime if the pressure in the enclosure drops to a level that would be substantially equal to the pressure outside the enclosure. Thus, a worker wishing to enter or exit an enclosure would communicate with the operator, who would deactivate the DPM for that enclosure until the worker has safely entered or exited the enclosure, upon which it is reactivated. It is within the scope of this invention that each enclosure be provided with a device wherein a worker desiring to enter to exit an enclosure would know the status of the hot work taking place within the enclosure. That worker can then activate a switch that would be pass the DPM and allow the door to be opened without causing a system shutdown and would allow the worker a predetermined amount of time to enter or exit the enclosure.

The three enclosures E1, E2, and E3, can all simultaneously and independently be monitored and controlled by an operator monitoring the operator controller console 1, which is the central control center for all enclosures E1, E2 and E3. It will be understood that the three enclosures are shown in the figures hereof for illustrative purposes only. The present invention can be practiced for only one enclosure or for any number of enclosures, and all enclosures can be independently and simultaneously monitored and controlled. Of course, practical considerations, such as construction time, number of workers required, and space limitations will dictate the maximum number of enclosures that can practically be built and simultaneously operated at any given facility. The operator controller console 1 will contain: a) a suitable means of power, preferably a conventional AC-DC power converter (not shown); b) at least one control device, one of those control devices preferably being a programmable logic controller (PLC). Other non-limiting examples of typical control devices that can be used in the practice of the present invention include: electrical relays, solenoids, switches, circuit breakers and fuses; c) a suitable means for monitoring the status of any one or more enclosures and performing certain predetermined control functions, such as: i) automatically and manually by-passing a differential pressure monitor (DPM) at each of the enclosures; ii) displaying the status of devices being used in the system; iii) providing scaled readings of particular devices in the system; and iv) performing control functions as needed or as programmed; d) a manual emergency shutdown switch that is capable of shutting all of the enclosures simultaneously; and e) an appropriate audible and visual alarm system. It is preferred that the means for monitoring the status of any one or more enclosure be a suitable touch screen application having a graphic display and programmed with suitable software.

The operator controller console 1 is integrally connected to a monitoring system. The monitoring system can be any suitable system that will allow communication between the components of the system, preferably the console and the gas detection monitors and preferably wireless communication. The monitoring system is comprised of a gas detection controller console 2, which preferably contains: a suitable radio modem transceiver; a central processing unit (CPU); a display device; and a plurality of interface cards. Interface cards are well known in the art and are typically a circuit board with the appropriate components to allow communication across boundaries, such as between hardware, or between software and hardware. Interface cards also allow communication between different software languages and codes that an application needs to communicate with each other and with hardware. It is to be understood that the entire gas detection monitoring system could be hardwired, although a wireless system is preferred. The display device is preferably part of a portable computer, more preferably a laptop computer. The gas detection monitors 4 are another component of the monitoring system and are in constant communication with the gas detection controller console 2, and are strategically placed within and about the enclosures as well as in the vicinity of hot work equipment, blowers and any of the other various equipment associated with the present enclosures system. It is preferred that at least two gas detection monitors be located inside each enclosure, at least one located near the ceiling and at least one near the floor to better cover the entire atmosphere of the enclosure. It is also with in the scope of the present invention to place gas monitors a distance away, preferably at least 10 feet away from the enclosure in such a pattern that substantially 100% of the perimeter of each enclosure is monitored by gas detection monitors. These perimeter gas detection monitors will also be placed in high and lower positions so that gases heavier than air are monitored as well as gases lighter than air. A remote antenna box AB1, is preferably used for receiving signals (radio frequency) from the plurality of gas detection monitors 4 and carrying them to the gas detection controller console 2, in the event that it is being used in the interior of a building.

It is within the scope of the present invention that the software used for the gas detection controller console 2 be suitable for labeling each of the plurality of gas detection monitors as to their physical location and being viewable via a display device. This will allow the operator to known immediately what monitor is sending a distress signal which will allow the operator to take immediate appropriate measures at the precise location of distress. For example, if the distress signal is not coming from a gas detection monitor located in the vicinity of the blower intake, the operator can over ride the blower shutdown function so that the blower continues to conduct fresh air into the enclosure.

As previously mentioned, each gas detection monitor 4 is in communication with the gas detection controller console 2. The gas detection monitors 4 are preferably portable and wireless, making them capable of being carried or worn by workers. Each monitor will be programmed to measure one or more non-limiting variables, such as temperature, combustible gases including those represented in the lower explosive limit (LEL), oxygen, carbon monoxide, and hydrogen sulfide. Although single point gas detection monitors can be employed, it is preferred that multi-point monitors be used. That is, a single point monitor is capable of monitoring the concentration level of only one variable, whereas a multi-point is capable of simultaneously monitoring the concentration of more than one variable and as a part of a wireless system the gas detection monitor will simultaneously communicate information to the transceiver of the gas detection controller console 2, which in turn transmits the signal through a suitable interface means, preferably an electronic interface card, that will translate the data into a protocol suitable for the software in an associated CPU to read, analyze, display, store, and respond thereto. It is preferred that one or more of the gas detection monitors also have the capability of either two-way voice communication or receiving text messages as a part of a network. The gas detection controller console 2 interfaces with the operator controller console 1 by any suitable means, such as also by the use of a suitable electronic interface card. The operator controller console 1 will have the capabilities as previously mentioned, such as showing the status of each enclosure, etc. The CPU of the gas detection controller console will also be capable of sending shutdown signals to the operator controller console 1, which in turn sends the signal to the shutdown controller 3, which signals the targeted equipment to shutdown. The ability of an operator to be able to monitor, on a display device, the concentration of atmospheric variables such as gas levels, temperature, etc., allows the operator to take the proper preemptive action prior to a level of emergency being reached. As previously mentioned, the operator controller console 1 will preferably display the status of enclosure systems, preferably by the use of a touch screen application. That is, a device that has the capability of being programmed to display the status of devices in the system based on predetermined variables. Any conventional touch screen application may be used although a color screen is preferred for extended alarm range notification through the use of colors for different alarm levels.

An upper concentration level for each atmospheric variable is programmed into the CPU software and if that level is reached, the system will automatically shutdown all targeted hot work equipment at all enclosures via communication with the shutdown controller 3. The shutdown controller 3 is in communication with all systems, devices and equipment of the overall system. For example, upon receiving an emergency shutdown signal from the operator controller console 1 via the gas detection controller console 2, a shutdown signal is sent to valves V1–V6 shutting down all gas delivery to the welding equipment. A shutdown signal is also sent to blower controls BC1 to BC3 as well as to the blow-down valve 6 and welding equipment WG1 to WG3. As previously mentioned, it is within the scope of this invention that blowers B1 to B3 continue to operate if it is determined that an emergency was not caused by the presence of combustible or flammable gases at the gas detection monitor at the intake of the blowers B1–B3. It is also within the scope of this invention that a function be provided that can shutdown all hot work in the case of a facility shutdown. That is, if a production platform, refinery or other facility has a general emergency shutdown, all hot-work will automatically be shutdown as a part of the facility shutdown.

In a preferred embodiment, the use of both a wireless gas detection system and some hard wired gas monitors, is used for implementing the automatic blower control concept.

Figure 2:
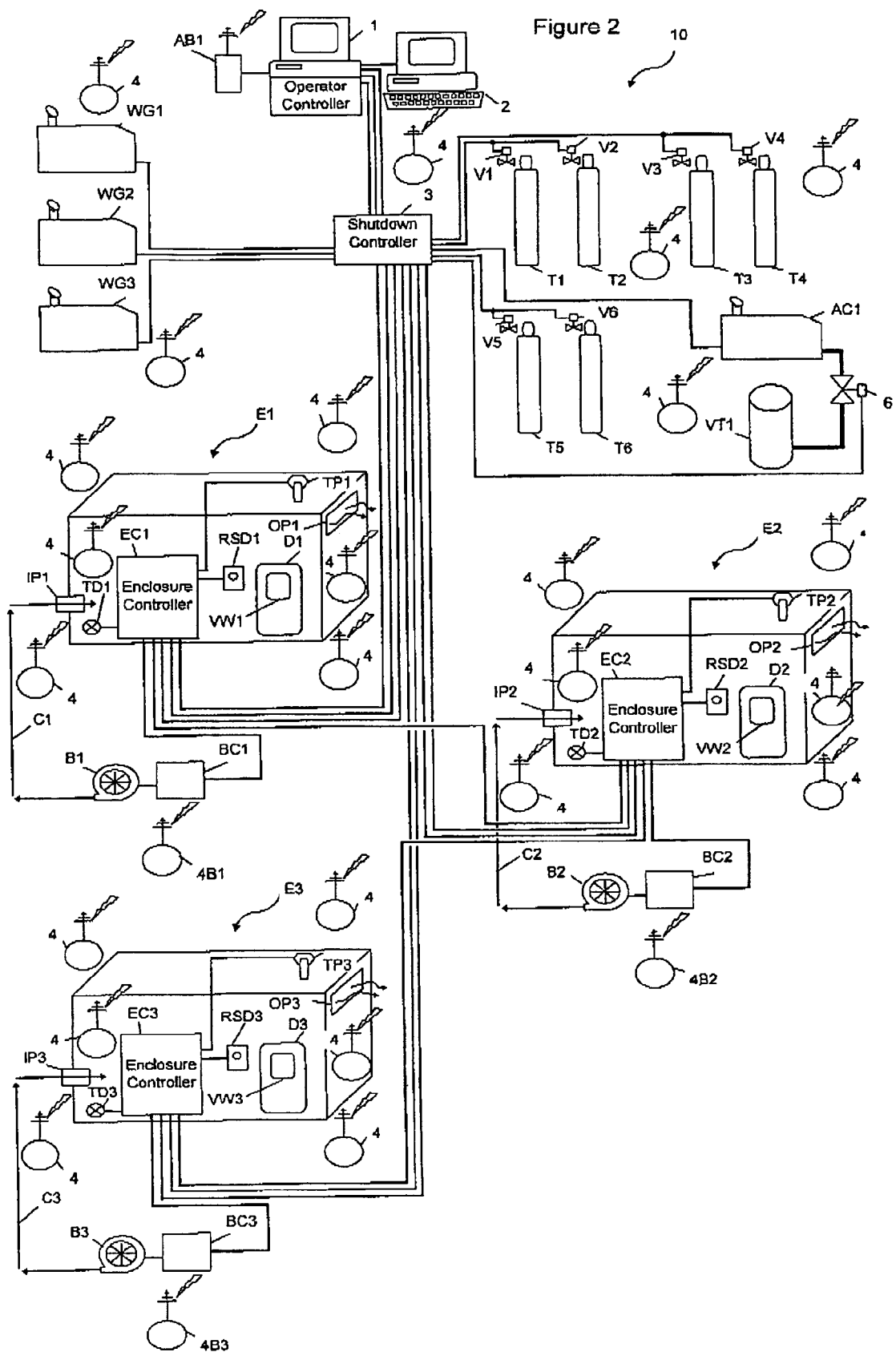
FIG. 2 hereof is a schematic representation of another preferred embodiment of the monitored enclosure system of the present invention also showing three enclosures capable of being simultaneously and independently monitored and controlled. This system utilizes most of the components of the enclosure system of FIG. 1 with the following exceptions and additions: the use of only a wireless gas detection system wherein the components of the gas detection controller console have been integrated into the operator controller console serving as a system console. This gas detection system allows for the implementation of the automatic blower control concept with an all wireless system. This figure also shows the integration of a camera and sensor module inside of the enclosure controllers. The camera is used for viewing the hot work being performed inside the enclosure and the sensor module for taking readings of variables such as temperature and humidity inside of the controllers. Another feature represented by this
Figure 3:
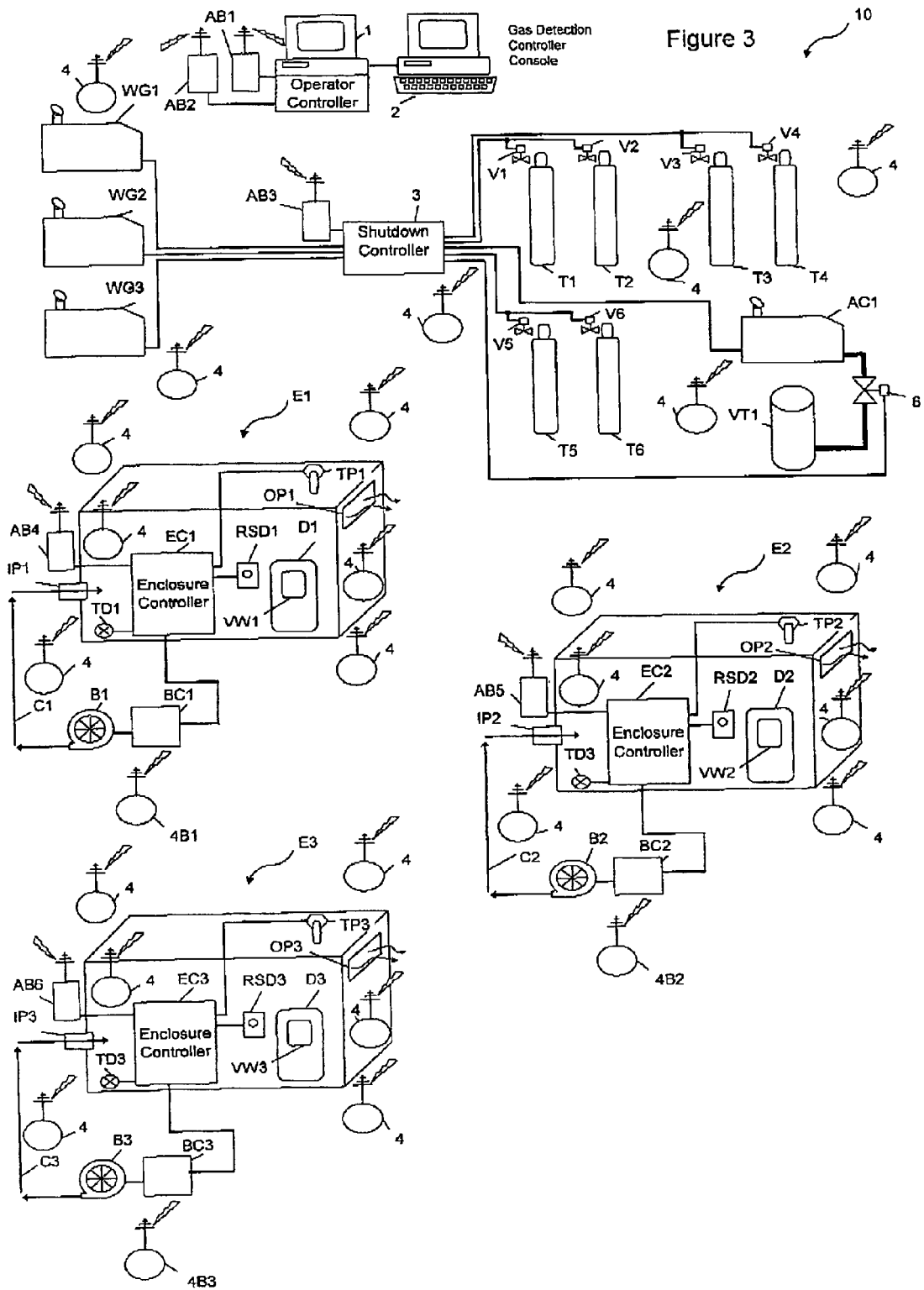
FIG. 3 hereof is a schematic representation of another preferred embodiment of the monitored enclosure system of the present invention also showing three enclosures capable of being simultaneously and independently monitored and controlled. This system utilizes components of the enclosures system of FIG. 1 hereof with some additional components added into the operator controller console, shutdown controller and enclosure controllers, for implementing wireless communication between all the controllers in the system. The use of a plurality of remote antenna boxes is also disclosed, as they are needed in providing communication between the controllers in the control system.
Figure 4:
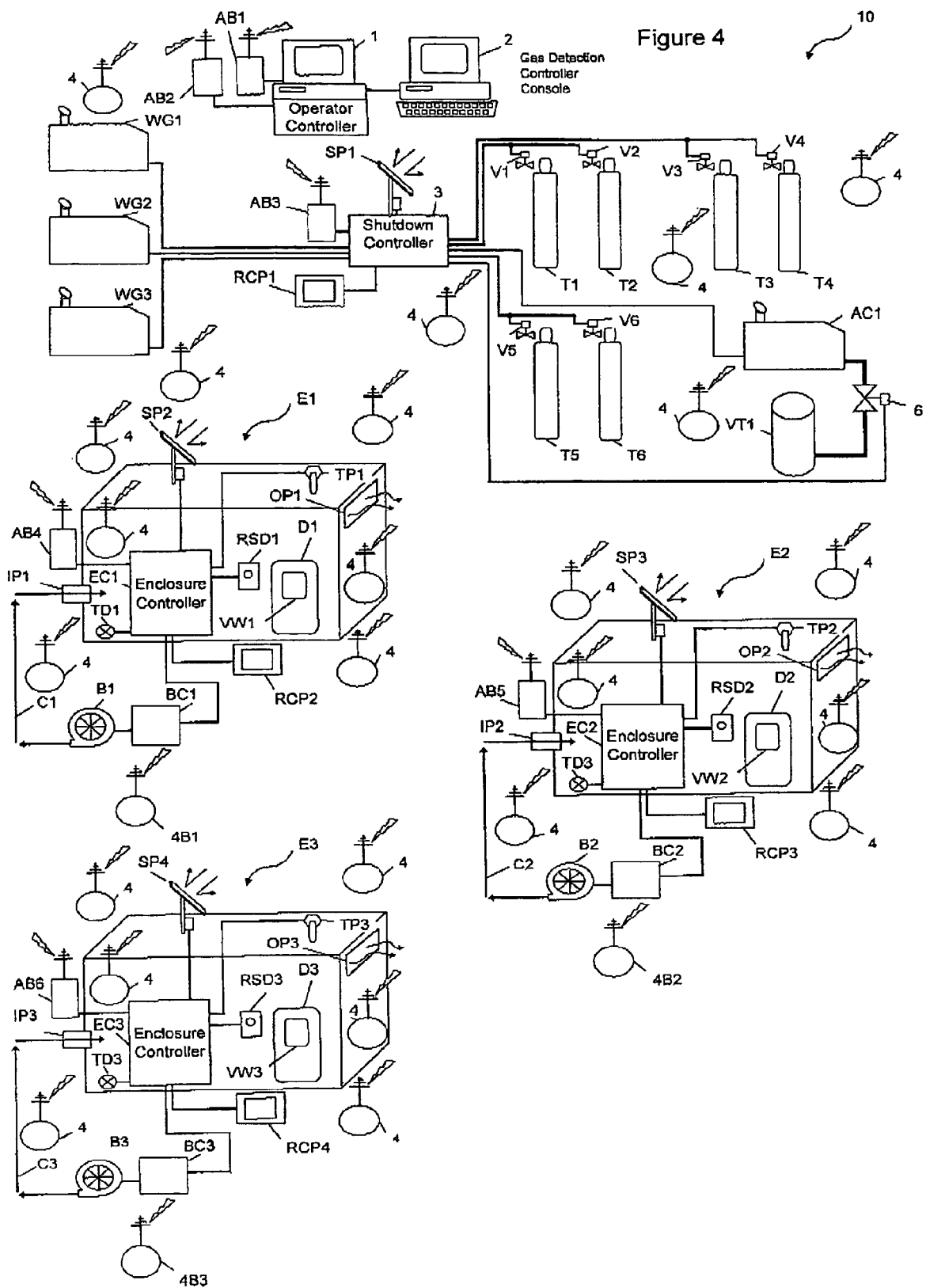
FIG. 4 hereof is a schematic representation of another preferred embodiment of the monitored enclosure system of the present invention also showing three enclosures capable of being simultaneously and independently monitored and controlled. This system shows the use of components of the enclosure system represented in FIG. 3 hereof with a few additional items added for an alternate power source and remote control capabilities. Represented as a part of this figure is the use of solar panels as an alternate power source for the shutdown controller and the plurality of enclosure controllers in the system. Also added to the shutdown controller and the enclosure controllers, is the use of a touch screen application for remotely controlling some predetermined control functions.

Other preferred embodiments are represented in FIGS. 2 to 4 hereof. The components of the gas direction controller console are integrated into the operator controller console, becoming a system console, and a portable computer is used as a display device, labeled as device (2) in these figures.

FIG. 2 hereof represents another preferred embodiment of the present invention. FIG. 2 further shows the use of a temperature probe TP1, TP2, TP3 and a temperature detector TD1, TD2, and TD3 in the inside of the enclosures E1, E2 and E3. The temperature probe is used to take ambient readings of the interior of the enclosure. These reachings can be used to warn the operator, sound an alarm and/or initiate a shutdown. The temperature detectors are used to take temperature readings of an object being used in the enclosures E1–E3. These readings can also be used to perform the functions previously described. All of FIG. 2 components that are common to FIG. 1 have the same nomenclature as those of FIG. 1 hereof. FIG. 2 hereof also shows more hardwired connections because of the addition of a camera module and a component sensor module as part of the enclosure controller. It is preferred in some instances that these two modules be hardwired to the shutdown console and controller console.

FIG. 3, which shows an all wireless monitoring system, represents another preferred embodiment of the present invention. FIG. 4 further shows the use of a plurality of additional remote antenna boxes AB2–AB6. The remote antenna boxes are used for wireless communication between the controllers being used in the operator controller console 1, the shutdown controller 3 and the enclosure controllers EC1, EC2, and EC3. All of FIG. 3 components that are common to FIG. 3 have the same nomenclature as those of FIG. 2 hereof.

FIG. 4 hereof represents another preferred embodiment of the present invention which is substantial all wireless system. FIG. 4 further shows the use of a plurality of remote control panels RCP1, RCP2, RCP3, and RCP4. These remote control panels are a touch screen application, which can be integrated into the shutdown and enclosure controllers or used remotely from the controllers, e.g. outside of the enclosures E1, E2 and E3 for controlling and viewing certain predetermined functions of the control system. FIG. 4 further discloses the use of an alternate power source for the shutdown and enclosure controllers. This alternate power source is preferably in the form of a solar panel SP1, SP2, SP3, and SP4; these devices can be used in lieu of a conventional AC-DC power converter supply. All of FIG. 4 components that are common to FIG. 3 hereof have the same nomenclature as those of FIG. 3 hereof.

Figure 5:
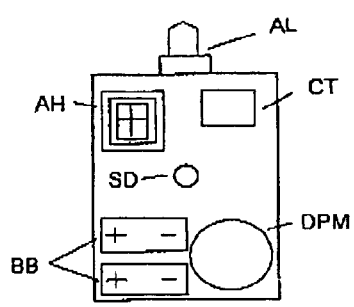
FIG. 5 is a diagram representation of one preferred embodiment of a configuration of the enclosure controllers utilized in the system disclosed in FIG. 1.

FIG. 5 is a diagram representation of a preferred embodiment of the enclosure controller of the enclosure system represented in FIG. 1 hereof. This controller would be used in the inside of the enclosures E1, E2 and E3. It contains the following components listed: the audible alarm AH, the visual alarm AL, the controller CT, the manual shutdown switch SD, the back-up batteries BB and the differential pressure monitor DPM.

Figure 6:
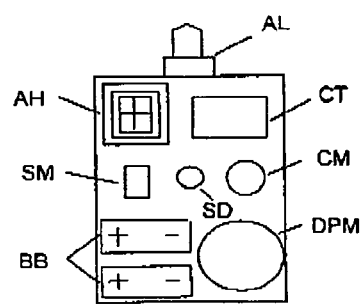
FIG. 6 is a diagram representation of one preferred embodiment of a configuration of the enclosure controllers utilized in the system disclosed in FIG. 2.

FIG. 6 is a diagram representation of another preferred embodiment of the enclosure controller. It shows the components used in the system represented in FIG. 2 hereof. It contains the following additional components from the controller described in FIG. 5; the camera module CM and the sensor module SM. All of FIG. 6 components that are common to FIG. 5 have the same nomenclature as those of FIG. 5 hereof.

Figure 7:
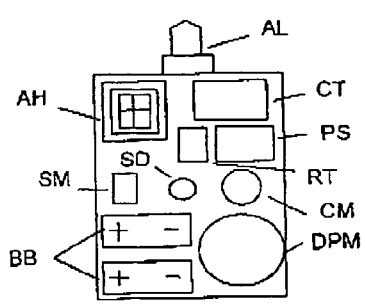
FIG. 7 is a diagram representation of one preferred embodiment of a configuration of the enclosure controllers utilized in the system disclosed in FIG. 3.

FIG. 7 is a diagram representation of another preferred embodiment of the enclosure controller and is the enclosure controller if the enclosure system represented in FIG. 3 hereof. It contains the following additional components from the controller described in FIG. 6: the power supply PS and the radio transceiver RT. All of FIG. 7 components that are common to FIG. 6 have the same nomenclature as those of FIG. 6 hereof.

Figure 8:
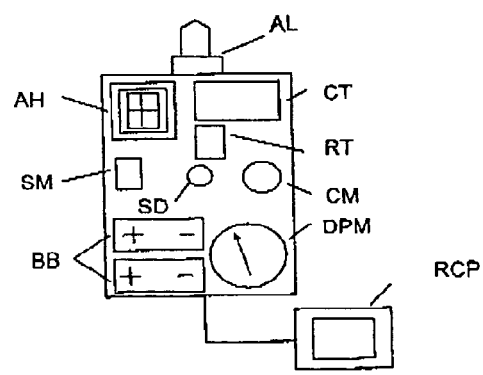
FIG. 8 is a diagram representation of one preferred embodiment of a configuration of the enclosure controllers utilized in the system disclosed in FIG. 4.

FIG. 8 is a diagram representation of the enclosure controller of the enclosure system represented in FIG. 4 hereof. It contains the following exceptions and additional components from the controller box described in FIG. 7: the power supply PS, has been removed due to the use of the alternate power source or solar panel SP2–SP4 described in FIG. 4, the DPM although still used has been changed to one that also contains a gauge for a visual display of the readings being taken, and a remote control panel for transmitting a signal to the operators controller console touch screen application, for viewing of the current readings. All of FIG. 7 components that are common to FIG. 6 have the same nomenclature as those of FIG. 6 hereof.

What is claimed is:

1. An enclosure system comprised of one or more enclosures built about at least one object to be hot worked at a facility wherein flammable or combustible materials are located within a hazardous distance from where the hot work is to be preformed, which enclosure system is comprised of:
    a) at least one enclosure, each enclosure comprising: i) enclosing walls, ceiling and floor defining a chamber in which the hot work is to be performed; ii) at least one door to allow workers to enter and exit; iii) at least one air inlet port; iv) at least one air outlet port; v) at least one blower having an intake and exhaust, which exhaust is in fluid communication with said at least one air inlet port; vi) a blower control in communication with said at least one blower and to a gas detection monitor at the intake of said at least one blower and to a shutdown controller, wherein said blower control has the capability of allowing the blower to continue to operate during an emergency shutdown that it not triggered by a combustible or flammable gas detected at said gas detection monitor located at the intake of said at least one blower; vii) at least one manual emergency shutdown switch inside of said enclosure; and viii) at least one manual emergency shutdown switch outside of, but within the perimeter of, said enclosure;
    b) a monitoring system comprised of:
        i) a plurality of gas detection monitors located at the predetermined locations inside and outside of each enclosure; wherein each of said gas detection monitors having a means of communication with a gas detection controller console; and
        ii) a gas detection controller console comprised of: a) a means capable of receiving data transmitted from the plurality of the gas detection monitors; b) an interface means capable of communicating data from the said receiving means of the console to a central processing unit; c) the central processing unit containing software capable of, inter alia, accepting, storing computing, and displaying data received from said plurality of gas detection monitors; d) a display device in communication with said central processing unit and capable of displaying data from said plurality of gas detection monitors; and e) an interface means capable of communicating a signal from said central processing unit to a control system;
    c) the control system comprised of:
        i) an operator controller console comprised of: a) a source of electrical power for the system; b) at least one control device; c) a means for displaying the status of each enclosure; d) a capability of communicating predetermined bypass and system shutdown signals to a shutdown controller; and e) an audible alarm that will activate when a shutdown occurs;
        ii) a shutdown controller capable of sending shutdown signals to one or more enclosure control devices one or more shutdown control devices, and to various equipment associated with the hot work to be conducted in said one or more enclosures; and
        iii) an enclosure controller comprised of a differential pressure monitored for monitoring the pressure within the enclosure relative to the pressure outside of the enclosure, a programmable logic control device, an audible alarm and a visual alarm.

2. The enclosure system of claim 1 wherein the walls, floor door and ceiling of the enclosure are composed of fire retardant wood.

3. The enclosure system of claim 2 wherein the floor of said enclosure is further covered with a layer of fire proof refractory cloth material on top of which is a layer of sheet metal.

4. The enclosure system of claim 1 wherein the door of each enclosure is a breakaway door that opens outward.

5. The enclosure system of claim 1 wherein each enclosure is provided with an explosion proof interior lighting system.

6. The enclosure system of claim 1 wherein the outlet port of at least one enclosure is provided with a spark resistant filter.

7. The enclosure system of claim 1 wherein the hot work to be performed is welding.

8. The enclosure system of claim 1 wherein the blower of each enclosure is an electrically operated blower.

9. The enclosure system of claim 1 wherein at least two gas detection monitors is located in each enclosure.

10. The enclosure system of claim 1 wherein the various equipment associated with the hot work is selected from a) welding machines, b) generators, c) air compressors, d) tanks for holding gases for a hot work operation, and e) a blow-down valve capable of bleeding compressed air from a compressed air system in the event of an emergency shut-down.

11. The enclosure system of claim 1 wherein the source of electrical power is an AC to DC power converter.

12. The enclosure system of claim 1 which is located at a facility selected from a drilling platform, a production platform, a jack-up right, a pumping station, a petroleum refinery, a chemical plant, a tank farm, an ocean going tanker, and a section of pipeline.

13. The enclosure system of claim 1 wherein there are at least two enclosures.

14. The enclosure system of claim 1 wherein the operator controller console contains a bypass function that can override a shutdown signal to one or more blowers.

15. The enclosure system of claim 1 wherein the operator controller console contains a bypass function that can override a shutdown signal triggered by a differential pressure monitor in any one or more of said enclosures to allow workers to enter and exit said one or more enclosures without triggering a shutdown.

16. The enclosure system of claim 1 wherein the gas detection console and the operator console is one integrated single console.

17. The enclosure system of claim 1 wherein one or more of said enclosures contains a temperature sensing means for measuring the temperature of an item during hot-working.

18. The enclosure system of claim 1 wherein one or more of the enclosure controllers contains at least one of: a) backup batteries; b) a radio transceiver; c) a camera module for visually monitoring the interior of the enclosure, the exterior of the enclosure, or both; d) a remote control panel; e) and a manual shutdown switch.

19. The enclosure system of claim 1 wherein a solar panel supplies power to the shutdown controller, the operator controller, or both.

20. The enclosure system of claim 1 wherein there is wireless communication between the operator controller and at least one enclosure controllers.

21. The enclosure system of claim 1 wherein at least one of the gas detection monitors is handheld.

22. The enclosure of claim 1 wherein at least one differential pressure monitor contains a means for continuously measuring and displaying pressure.

23. The enclosure system of claim 1 wherein a solar panel supplies power to the shutdown controller, the operator controller, or both.

24. The enclosure of claim 1 wherein the enclosure also contains at least one viewing window.

25. An enclosure system comprised of one or more enclosures built about at least one object to be hot worked at a facility wherein flammable or combustible materials are located within a hazardous distance from where the hot work is to be performed, which enclosure system is comprised of:
   a) at least one enclosure, each enclosure comprising: i) enclosing walls, ceiling and floor defining a chamber in which the hot work is to be performed; ii) at least one door to allow workers to enter and exit; iii) at least one viewing window; iv) at least one air inlet port; v) at least one air outlet port; vi) at least one blower having an intake and an exhaust, which exhaust is in fluid communication with said at least one air inlet port; vii) a blower control in communication with said at least one blower and to a gas detection monitor at the intake of said at least one blower and to a shutdown controller, wherein said blower control has the capability of allowing the blower to continue to operate during an emergency shutdown that is not triggered by a combustible or flammable gas detected at a gas detection monitor located at the intake of said one or more blower; viii) at least one manual emergency shutdown switch inside of said enclosure; and ix) at least one manual emergency shutdown switch outside of, but within the immediate perimeter of, said enclosure;
   b) a monitoring system comprised of:
      i) a plurality of gas detection monitors located at the predetermined locations inside and outside of each enclosure, wherein at least one gas detection monitor is handheld and portable; and wherein each of said gas detection monitors having a wireless means of communication with a gas detection controller console; and
      ii) a gas detection controller console comprised of: a) a means capable of receiving wireless data transmitted from the plurality of the gas detection monitors; b) an interface means capable of communicating data from the said receiving means of the console to a central processing unit; c) a central processing unit containing software capable of, inter alia, accepting, storing computing, and displaying data received from said plurality of gas detection monitors; d) a display device in communication with said central processing unit and capable of displaying data from said plurality of gas detection monitors; and c) an interface means capable of communicating a signal from said central processing unit to a control system.
   c) a control system comprised of:
      i) an operator controller console comprised of: a) a source of electrical power for the system; b) at least one control device; c) a means for displaying the status of each enclosure; d) the capability of communicating predetermined bypass and system shutdown signals to a shutdown controller; e) a by-pass function that has the capability of overriding a shutdown signal triggered by a differential pressure monitor in any one or more of said enclosures to allow workers to enter and exit said one or more enclosures without triggering a shutdown; and f) an audible alarm that will activate when a shutdown occurs;
      ii) a shutdown controller capable of sending shutdown signals to one or more enclosure control devices, one or more shutdown control devices, and to various equipment associated with the hot work to be conducted in said one or more enclosures; and wherein there is wireless communication between the operator controller, the gas detection controller, and the shutdown controller; and
      iii) an enclosure controller comprised of a differential pressure monitor for monitoring the pressure within the enclosure relative to the pressure outside of the enclosure, a programmable logic control device, an audible alarm and a visual alarm.

26. The enclosure system of claim 25, wherein the walls, floor, door and ceiling of the enclosure are composed of fire retardant wood and which floor is further covered with a layer of fire proof refractory cloth material on top of which is a layer of sheet metal.

27. The enclosure system of claim 25, wherein the door of each enclosure is a breakaway door that opens outward.

28. The enclosure system of claim 25 wherein each enclosure is provided with an explosion proof interior lighting system and wherein the outlet port of at least one enclosure is provided with a spark resistant filter.

29. The enclosure system of claim 25, wherein the blower of each enclosure is an electrically operated blower.

30. The enclosure system of claim 25 wherein at least two gas detection monitors is located in each enclosure.

31. The enclosure system of claim 25 wherein the various equipment associated with the hot work is selected from a) welding machines, b) generators, e) air compressors, d) tanks for holding gases for a hot work operation, and e) a blow-down valve capable of bleeding compressed air from a compressed air system in the event of an emergency shut-down.

32. The enclosure system of claim 25 wherein the source of electrical power is an AC to DC power converter.

33. The enclosure system of claim 25 wherein is located at a facility selected from a drilling platform, a production platform, a jack-up rig, a pumping station, a petroleum refinery, a chemical plant, a tank farm, an ocean going tanker, and a section of pipeline.

34. The enclosure system of claim 25 wherein the operator controller console contains a bypass function that can override a shutdown signal to one or more blowers.

35. The enclosure system of claim 25 wherein the operator controller console contains a bypass function that can override a shutdown signal triggered by a differential pressure monitor in any one or more of said enclosures to allow workers to enter and exit said one or more enclosures without triggering a shutdown.

36. The enclosure system of claim 25 wherein the gas detection console and the operator console is one integrated single console.

37. The enclosure system of claim 25 wherein one or more of said enclosures contains a temperature sensing means for measuring the temperature of an item during hot-working.

38. The enclosure system of claim 25 wherein one or more of the enclosure controllers contains at least one of: a) backup batteries; b) a radio transceiver; c) a camera module for visually monitoring the interior of the enclosure, the exterior of the enclosure, or both; d) a remote control panel; e) and a manual shutdown switch.

39. The enclosure of claim 25 wherein at least one differential pressure monitor contains a means for continuously measuring and display pressure.

40. The enclosure of claim 25 wherein the enclosure also contains at least one viewing window.

* * * * *